United States Patent [19]
Hatatani et al.

[11] Patent Number: 5,648,014
[45] Date of Patent: Jul. 15, 1997

[54] ACICULAR MAGNETIC IRON OXIDE PARTICLES AND PROCESS FOR PRODUCING THE SAME

[75] Inventors: Mitsuaki Hatatani; Osamu Okimoto; Toshitada Shigemura; Yoshifumi Fukuhara; Hideaki Sadamura, all of Yamaguchi-ken, Japan

[73] Assignee: Toda Kogyo Corporation, Japan

[21] Appl. No.: 569,764

[22] Filed: Dec. 8, 1995

[30] Foreign Application Priority Data

Dec. 9, 1994 [JP] Japan .................. 6-331654

[51] Int. Cl.$^6$ ............................................. C09C 1/22
[52] U.S. Cl. .................. 252/62.56; 428/403; 427/212; 427/215
[58] Field of Search ............... 252/62.56; 428/403; 427/212, 215

[56] References Cited

U.S. PATENT DOCUMENTS 4,923,519  5/1990  Rodi et al. ................. 106/439
5,314,750  5/1994  Takedoi et al. ............. 428/402

FOREIGN PATENT DOCUMENTS 0377933  4/1989  European Pat. Off. ..

*Primary Examiner*—Melissa Bonner
*Attorney, Agent, or Firm*—Nixon & Vanderhye

[57] ABSTRACT

Acicular magnetic iron oxide particles comprise:

acicular magnetite particles having 10 to 24% by weight of ferrous as core particles;

a magnetite coating which is formed on the surfaces of said acicular magnetite particles by epitaxial growth and which has maghemite at least in a part of the surface of said magnetite coating; and a cobalt-containing oxide layer which is formed on said magnetite coating and which contains cobalt of 1.5 to 2.5 wt % based on the total weight of said acicular magnetic iron oxide particles.

6 Claims, No Drawings

ACICULAR MAGNETIC IRON OXIDE PARTICLES AND PROCESS FOR PRODUCING THE SAME

BACKGROUND OF THE INVENTION

The present invention relates to acicular magnetic iron oxide particles and a process for producing the same. More particularly, the present invention relates to acicular magnetic iron oxide particles which have a high saturation magnetization and an excellent black chromaticity, and which have a high coercive force and an excellent stability of magnetic characteristics with the passage of time in spite of a small cobalt content, and to a process for producing such acicular magnetic iron oxide particles.

With the recent development of miniaturized and lightweight magnetic recording/reading-out apparatuses, the requirement for a recording medium having a higher recording density such as a magnetic tape and a magnetic disk has been increasing more and more.

In order to improve the recording density of a magnetic recording medium, the magnetic particles as a material should be as fine as possible and should have as high a coercive force as possible. This fact is described in, for example, on pp. 185 to 187 of *THE COLLECTED DATA ON MAGNETIC RECORDING MEDIA* (1985), published by Synthetic Electronics Research, " - - - The recent development of the technique of magnetic tapes is remarkable - - - and high-density recording has been realized. In any of audio apparatuses, video apparatuses and floppy disk drives, the importance is placed on a miniaturization, light-weight, and good operability in addition to high-density short-wavelength signal recording technique. In order to make a magnetic film match such an apparatus, a thin film having an ultrasmooth surface of 1 to 2 μm-thick has been developed by a magnetic coating technique which uses fine magnetic particles having a high coercive force. - - - A video tape of a high-grade (HG) type which uses fine magnetic particles was developed in the fall of 1982. - - - In the near future, remarkable improvement of the picture quality will be expected - - - using ultrafine magnetic iron oxide particle for a tape - - - "

In video apparatuses, since a mechanism for optically detecting the end of the running tape is generally adopted, if the light transmittance of the video tape used is high, a malfunction is apt to occur. However, if the acicular maghemite particles which are often used for a video tape due to their magnetic stability with the passage of time, are made finer, the light transmittance is inconveniently made higher.

Although an attempt to improve the light transmittance by adding a large amount of nonmagnetic filler such as carbon black has been made, the use of a nonmagnetic material such as carbon black obstructs the enhancement of high-density recording.

In order to improve the light transmittance without adding a non-magnetic filler, Co-coated acicular magnetic iron oxide particles obtained by coating with Co the surfaces of acicular magnetite particles, which are more excellent in the black chromaticity than acicular maghemite particles, have come into use.

Since acicular magnetite particles have a larger saturation magnetization than acicular maghemite particles, they are suitable for high-density recording.

However, the acicular magnetic iron oxide particles obtained by coating the surfaces of acicular magnetite particles with Co are disadvantageous in that the ferrous contained therein are gradually oxidized so that the magnetic characteristics are deteriorated with the passage of time. This tendency is more prominent as the particles are made finer.

This fact is described in, for example, Japanese Patent Application Laid-Open (KOKAI) No. 3-19127 (1991), " - - - When the $Fe^{2+}/Fe^{3+}$ ratio in ferromagnetic iron oxide is increased, the magnetic stability is lowered, a change in the Hc of the magnetic recording medium is increased, and with this change, the signal recording property becomes unstable. Therefore, magnetic recording media using ferromagnetic iron oxide having a large $Fe^{2+}/Fe^{3+}$ ratio are not widely used. - - - "

It is conventionally known that the larger the amount of Co coating the acicular iron oxide particles, the better the stability of the coercive force with the passage of time. Therefore, in order to improve the coercive force stability with the passage of time, namely, the magnetic stability with the passage of time, the amount of Co coating the acicular iron oxide particles is often increased. However, the cobalt supplies are unstable and the cost is often raised due to the limited producing area of cobalt or the like. It is therefore required to reduce the amount of cobalt used in the near future. As well known, if the amount of cobalt coating acicular magnetite particles is reduced, it is impossible to obtain an adequate coercive force, and the magnetic stability with the passage of time is deteriorated as described above. Accordingly, acicular magnetic iron oxide particles having an adequate coercive force and a good magnetic stability with the passage of time in spite of a small cobalt content is now in demand.

As examples of a method of producing cobalt-coated magnetic iron oxide particles having a good magnetic stability with the passage of time, the following methods are conventionally known: a method of producing a magnetite layer on the surface of acicular magnetite particles as the core particles in a cobalt coating process, producing a spinel ferrite layer composed of magnetite and a cobalt compound on the surfaces of the acicular magnetite particles by adding a cobalt salt, and further oxidizing the surfaces (Japanese Patent Application Laid-Open (KOKAI) No. 6-124827 (1994)); a method of depositing and forming a magnetite layer on the surfaces of acicular magnetite particles by the oxidation reaction of a ferrous salt, and further adding a ferrous salt and a cobalt salt so as to deposit a ferromagnetic iron oxide layer containing cobalt atoms by the oxidation reaction (Japanese Patent Publication No. 58-50005 (1983)); a method of coating acicular magnetite particles first with a ferrous compound and then coating the resultant particles with a cobalt compound (Japanese Patent Publication No. 63-23137 (1988)); a method of adding a ferrous salt to acicular magnetite particles and stirring the mixture at a temperature not higher than the boiling point for not less than 30 minutes, and adding a cobalt salt to the resultant mixture and stirring the mixture at a temperature not higher than the boiling point to coat particles with cobalt (Japanese Patent Application Laid-Open (KOKAI) Nos. 61-17426 (1986) and 61-252605 (1986)); and a method of coating the surfaces of core particles with a ferrous compound layer, forming an inner layer composed of a ferrous compound and a cobalt compound thereof, and forming as an outer layer a cobalt compound layer thereon (Japanese Patent Application Laid-Open (KOKAI) Nos. 63-295441 (1988) and 63-303817 (1988)).

Acicular magnetic iron oxide particles which have a high saturation magnetization and an excellent black chromaticity, and which have a high coercive force and an excellent magnetic stability with the passage of time in spite of a small cobalt content are now in the strongest demand. However, none of the magnetic iron oxide particles described in Japanese Patent Application Laid-Open (KOKAI) No. 6-124827 (1994), Japanese Patent Publication Nos. 58-50005 (1983) and 63-23137 (1988), Japanese Patent Application Laid-Open (KOKAI) Nos. 61-17426 (1986), 61-252605 (1986), 63-295441 (1988), and 63-303817 (1988) can be said to be satisfactory.

In the magnetic iron oxide particles described in Japanese Patent Application Laid-Open (KOKAI) No. 6-124827 (1994), the amount of cobalt added to the core particles is as large as 3.6 wt % based on the core particles and the coercive force is not so much improved as expected from the amount of cobalt added. In addition, a magnetite layer is formed on the surfaces of the particles in a non-oxidizing atmosphere, and electrons move from the ferrous in the adsorbed ferrous hydroxide colloid into the core particles, which damages the core particles.

The magnetic iron oxide particles described in Japanese Patent Publication No. 58-50005 (1983) are produced by forming a magnetite layer as a lower layer on the surfaces of the core particles, and simultaneously adding a ferrous salt and a cobalt salt thereto so as to form a ferromagnetic iron oxide layer containing cobalt in an oxidizing atmosphere. The ferromagnetic iron oxide layer containing cobalt formed in this manner is comparatively thick because it contains ferrous and ferric, so that the cobalt concentration becomes relatively low and the effect on the improvement of the coercive force is small.

In the magnetic iron oxide particles described in Japanese Patent Publication No. 63-23137 (1988), when the coating process is conducted at a low temperature, as shown in Examples, ferrous hydroxide colloid is difficult to adsorb onto the core particles and it floats outside of the core particles, which leads to an insufficient magnetic stability with the passage of time. The heat treatment such as autoclaving and dry heating adopted after the coating process so as to improve the magnetic stability with the passage of time furthers the diffusion of cobalt ions into the core particles, so that the effect on improvement is insufficient.

In the process for producing the magnetic iron oxide particles described in Japanese Patent Application Laid-Open (KOKAI) Nos. 61-17426 (1986) and 61-252605 (1986), an aqueous solution of a ferrous salt is added to magnetite particles and the resultant mixture is stirred at a temperature not higher than the boiling point for not less than 30 minutes. As shown in the examples, an aqueous solution of a ferrous salt is added at 70° C. and the resultant mixture is stirred at 100° C. When the aqueous solution is added at such a high temperature, a rapid chemical reaction is produced before a ferrous hydroxide colloid is uniformly mixed, which increases the nonuniformity in the reaction and the coercive force distribution.

In the magnetic iron oxide particles described in Japanese Patent Application Laid-Open (KOKAI) Nos. 63-295441 (1988) and 63-303817 (1988), the amount of cobalt used is as large as not less than 4 wt % based on the core particles, as shown in Examples. If the coating process is conducted at a low temperature, ferrous hydroxide colloid is difficult to adsorb onto the core particles and it floats outside of the core particles, which leads to an insufficient magnetic stability. In addition, the heat treatment such as autoclaving and dry heating adopted after the coating process so as to improve the magnetic stability does not produce a sufficient effect.

Accordingly, the technical problem of the present invention is to provide acicular magnetic iron oxide particles which have a high saturation magnetization and excellent black chromaticity, and which have a high coercive force and an excellent magnetic stability with the passage of time (magnetic stability independent to change with time) in spite of a small cobalt content.

As a result of the present inventors' studies undertaken so as to solve the above-described problems, it has been found that by adding an aqueous solution of a ferrous salt to an alkali suspension containing acicular magnetite particles having 10 to 24 wt % of ferrous at a temperature of 40° to 60° C. in a non-oxidizing atmosphere so as to produce a ferrous hydroxide colloid; blowing an oxygen-containing gas into the suspension so as to oxidize the colloid, thereby forming the magnetite coating (magnetite layer as a lower layer) on the surfaces of the acicular magnetite particles by epitaxial growth; further continuously conducting oxidation under predetermined conditions so as to oxidize the surface of the magnetite coating, thereby forming the maghemite at least in a part of the surface of the magnetite coating; after changing the atmosphere to a non-oxidizing atmosphere, adding an aqueous solution of a cobalt salt to the resultant suspension; and heating and stirring the obtained suspension at 60° to 100° C. so as to form the cobalt-containing oxide layer on the surface of the maghemite by epitaxial growth, the obtained acicular magnetic iron oxide particles comprising acicular magnetite particles coated with a magnetite coating as a lower layer formed on the surfaces of the particles by epitaxial growth, a cobalt-containing oxide layer as an upper layer in which the cobalt content is 1.5 to 2.5 wt % based on the total weight of the acicular magnetic iron oxide particles, and maghemite existing between the magnetite coating and the cobalt-containing oxide layer, have a high coercive force and an excellent magnetic stability with the passage of time. The present invention has been achieved on the basis of this finding.

SUMMARY OF THE INVENTION

It is an object of the present invention to provide acicular magnetic iron oxide particles which have a high saturation magnetization and excellent black chromaticity, and which have a high coercive force and an excellent magnetic stability with the passage of time in spite of a small cobalt content, and a process for industrially producing the acicular magnetic iron oxide particles.

To accomplish this aim, in an aspect of the present invention, there is provided acicular magnetic iron oxide particles comprising: acicular magnetite particles having 10 to 24 wt % of ferrous as core particles, a magnetite coating which is formed on the surfaces of the acicular magnetite particles by epitaxial growth and in which maghemite is formed at least in a part of the surface of the magnetite coating, and a cobalt-containing oxide layer which is formed on the magnetite coating and which contains 1.5 to 2.5 wt % of cobalt based on the total weight of the acicular magnetic iron oxide particles.

In a second aspect of the present invention, there is provided a process for producing acicular magnetic iron oxide particles comprising the steps of:

adding an aqueous solution of a ferrous salt to an alkali suspension containing acicular magnetite particles having 10 to 24 wt % of ferrous at a temperature of 40° to 60° C. in a non-oxidizing atmosphere so as to produce a ferrous hydroxide colloid on the surface of said acicular magnetite particles;

blowing an oxygen-containing gas into said suspension so as to oxidize said ferrous hydroxide colloid and form a magnetite coating on the surfaces of said acicular magnetite particles;

continuing oxidation so as to oxidize the surface of said magnetite coating and to form maghemite at least in a part of the surface of said magnetite coating;

after changing the atmosphere to a non-oxidizing atmosphere adding an aqueous solution of a cobalt salt; and heating and stirring said suspension to 60° to 100° C. so as to form a cobalt-containing oxide layer on the surface of said magnetite coating and maghemite.

In a third aspect of the present invention, there is provided acicular magnetic iron oxide particles comprising:

acicular magnetite particles having 10 to 24 wt % of ferrous as core particles, a magnetite coating which is formed on the surfaces of said acicular magnetite particles by epitaxial growth and which has maghemite at least in a part of the surface of said magnetite coating, and a cobalt-containing oxide layer which is formed on said magnetite coating and which contains cobalt of 1.5 to 2.5 wt % based on the total weight of said acicular magnetic iron oxide particles; and produced by the process comprising the steps of:

adding an aqueous solution of a ferrous salt to an alkali suspension containing acicular magnetite particles having 10 to 24 wt % of ferrous at a temperature of 40° to 60° C. in a non-oxidizing atmosphere so as to produce a ferrous hydroxide colloid on the surface of said acicular magnetite particles, blowing an oxygen-containing gas into said suspension so as to oxidize said ferrous hydroxide colloid and form a magnetite coating on the surfaces of said acicular magnetite particles, continuing oxidation so as to oxidize the surface of said magnetite coating and to form maghemite at least in a part of the surface of said magnetite coating, after changing the atmosphere to a non-oxidizing atmosphere adding an aqueous solution of a cobalt salt, and heating and stirring said suspension to 60° to 100° C. so as to form a cobalt-containing oxide layer on the surface of said magnetite coating and maghemite.

DETAILED DESCRIPTION OF THE INVENTION

Acicular magnetic iron oxide particles according to the present invention are composed of acicular magnetite particles as the core particles and a magnetite coating formed on the surfaces of the acicular magnetite particles by epitaxial growth, a cobalt-containing oxide layer formed on the magnetite coating by epitaxial growth, and maghemite existing on the interface of the magnetite coating and the cobalt-containing oxide layer. The maghemite may locally exist at least one part of the surface of the magnetite coating. The acicular magnetic iron oxide particles according to the present invention have a major axial diameter of 0.05 to 0.4 µm, preferably 0.15 to 0.3 µm and an aspect ratio of not less than 4, preferably 5 to 15.

The acicular magnetic iron oxide particles according to the present invention contain 10 to 24 wt % of ferrous ($Fe^{2+}$). In the consideration of the black chromaticity, acicular magnetic iron oxide particles containing 13 to 24 wt % of $Fe^{2+}$ is preferable. The acicular magnetic iron oxide particles of the present invention also contain 1.5 to 2.5 wt %, preferably 1.5 to 2.0 wt % of cobalt (calculated as Co). If the cobalt content is less than 1.5 wt %, it is difficult to obtain a sufficient coercive force and the magnetic stability with the passage of time is deteriorated. If the cobalt content exceeds 2.5 wt %, although a sufficient coercive force is obtained, it is unfavorable from the point of view of economy.

The coercive force of the acicular magnetic iron oxide particles of the present invention is 650 to 750 Oe, preferably 670 to 750 Oe. The saturation magnetization is 77 to 90 emu/g, preferably 80 to 90 emu/g.

With respect to the magnetic stability with the passage of time of the acicular magnetic iron oxide particles of the present invention, the change of the coercive force is −60 to +30 Oe, preferably −50 to +30 Oe in an accelerated stability test in which the particles are permitted to stand for 14 days in the atmosphere of 90% relation humidity at a temperature of 60° C.

A process for producing acicular magnetic iron oxide particles according to the present invention will now be described.

The core particles used in the present invention, acicular magnetite particles containing about 10 to 24 wt % of ferrous ($Fe^{2+}$). In the consideration of black chromaticity, acicular magnetite particles containing 13 to 24 wt % of ferrous are preferable.

The acicular magnetite particles as the core particles used in the present invention have a major axial diameter of 0.05 to 0.4 µm and an aspect ratio (major axial diameter/minor axial diameter) of not less than 4, and they may have not only an acicular shape but also a spindle shape, a strip shape, a rice grain shape or the like.

Preferable acicular magnetite particles used as the core particles in the present invention have a major axial diameter of 0.15 to 0.3 µm and an aspect ratio of not less than 5, more preferably an aspect ratio (major axial diameter/minor axial diameter) of not less than 7.

It is possible to use as the core particles acicular magnetite particles containing at least one selected from the group consisting of Ni, Si, Al, Zn, P, Ba, Sr, Ca, and Pb.

The coercive force of the acicular magnetite particles used as the core particles in the present invention is 300 to 450 Oe and the saturation magnetization is 70 to 90 emu/g. Acicular magnetite particles having a coercive force of 350 to 450 Oe and a saturation magnetization of 75 to 90 emu/g are preferred as the core particles.

As an aqueous alkali hydroxide used in the present invention, an aqueous sodium hydroxide, an aqueous potassium hydroxide, ammonia water, etc. are usable. The OH-group concentration after the aqueous alkali hydroxide solution is added, is 0.05 to 3.0 mol/liter. If the OH-group concentration is less than 0.05 mol/liter, the cobalt coating reaction is insufficient. If the OH-group concentration exceeds 3.0 mol/liter, cobalt hydroxide produced unfavorably starts to dissolve.

As an aqueous solution of a ferrous salt used in the present invention, an aqueous ferrous sulfate, an aqueous ferrous chloride, etc. are usable. The amount of aqueous solution of a ferrous salt added is 3 to 15 wt % (calculated as $Fe^{2+}$) based on the acicular magnetite particles. If the amount is less than 3 wt %, the magnetite coating formed on the surfaces of the core particles is so thin that it is difficult to obtain a high coercive force when a cobalt compound is coated on the surface of the magnetic coating. On the other hand, if the amount exceeds 15 wt %, the coercive force distribution of the acicular magnetic iron oxide particles obtained becomes too large. In order to reduce the electric resistance, the addition of 5 to 15 wt % of an aqueous solution of a ferrous salt is preferable.

As the aqueous solution of a cobalt salt used in the present invention, aqueous cobalt sulfate, aqueous cobalt chloride, aqueous cobalt nitrate and the like are usable. The amount of aqueous solution of a cobalt salt added 1.5 to 2.5 wt %, preferably 1.75 to 2.0 wt % (calculated as Co) based on the acicular magnetite particles. If the cobalt content is less than 1.5 wt %, it is difficult to obtain a sufficient coercive force and the magnetic stability with the passage of time is deteriorated. If the cobalt content exceeds 2.5 wt %, although a sufficient coercive force is obtained, it is unfavorable from the point of view of economy.

In the present invention, an alkali suspension of acicular magnetite particles is first produced by adding an aqueous alkali solution to an aqueous dispersion of acicular magnetite particles or adding an aqueous dispersion of acicular magnetite particles to an aqueous alkali solution. It is to prevent the progress of a chemical reaction due to a rapid change of the temperature caused by a rapid increase in the temperature with the heat produced by the dilution of an aqueous alkali hydroxide solution when the aqueous alkali solution is added to an aqueous ferrous salt solution, by mixing the aqueous alkali solution with the aqueous dispersion of acicular magnetite particles prior to the addition of an aqueous solution of a ferrous salt and an aqueous solution of a cobalt salt. The pH of the alkali suspension is preferably not less than 11.

The concentration of the aqueous dispersion of the acicular magnetite particles is preferably 20 to 1000 g/liter. If the concentration is less than 20 g/liter, the productivity become unfavorable. If the concentration is more than 1000 g/liter, a uniform cobalt coating reaction may not be expected.

An aqueous solution of a ferrous salt is next added to the aqueous dispersion of the acicular magnetite particles at a temperature of 40° to 60° C. If the temperature is lower than 40° C., the reaction of forming magnetite from the ferrous hydroxide colloid adsorbed onto the surfaces of the core particles is so slow that the ferrous hydroxide colloid floats in the suspension outside on the core particles. As a result, it is difficult to obtain the magnetic stability with the passage of time in the same way as in the simultaneous addition of an aqueous solution of a cobalt salt and an aqueous solution of a ferrous salt to the alkali dispersion of the acicular magnetite particles. If the temperature exceeds 60° C., the reaction is so rapid that the reaction thereof proceeds before a uniform mixture is obtained, so that the coercive force distribution becomes unfavorably large.

After the addition of the aqueous solution of a ferrous salt, an oxygen-containing gas is blown into the resultant suspension under stirring for oxidation. The ferrous hydroxide colloid is oxidized and forms a magnetite coating on the surfaces of the acicular magnetite particles by epitaxial growth. The oxidation is continued so as to form maghemite at the surface of the magnetite coating. It is important to control the degree of oxidation in the formation of maghemite.

If it is assumed that the measured value (%) of [$Fe^{2+}$/total Fe] in the particle composed of the core particle and magnetite coating and maghemite existing at the surface thereof, which are formed on the core particle is A, the measured value (%) of [$Fe^{2+}$/total Fe] in the core particles is a and the amount of [$Fe^{2+}$] added on the assumption that the [total Fe] in the core particles is 100 is m, then the percentage (%) of the remaining ferrous ($Fe^{2+}$) in the ferrous ($Fe^{2+}$) added is represented by the formula: [(100+m)A−100a]/m. By controlling the degree of oxidation in the range which satisfies the following formula:

$$20 \leq [(100+m)A-100a]/m \leq 30,$$

wherein A: measured value (%) of [$Fe^{2+}$/total Fe] in the particle composed of the core particle and magnetite coating and maghemite existing at the surface thereof, which are formed on the core particle a: measured value (%) of [$Fe^{2+}$/total Fe] in the core particles m: amount of [$Fe^{2+}$] added on the assumption that the [total Fe] in the core particles is 100, it is possible to form a magnetite coating on the surfaces of the acicular magnetite particles by epitaxial growth, and then to form maghemite by continuously oxidizing at least in a part of the magnetite coating formed.

Actually, in the process of adding the aqueous solution of a ferrous salt is first added to the alkali suspension of acicular magnetite particles at a temperature of 40° to 60° C. in a non-oxidizing atmosphere so as to produce the ferrous hydroxide colloid and then oxidizing the ferrous hydroxide colloid by blowing an oxygen-containing gas, a sampling inspection is conducted at predetermined intervals of time so as to examine a change in the [$Fe^{2+}$/total Fe] ratio A with a reaction time, and the period in which the [$Fe^{2+}$/total Fe] ratio A is in the above-described range is calculated in advance. A ferrous salt is added and a ferrous hydroxide colloid is oxidized under the same conditions, and blowing of the oxygen-containing gas is stopped within the period calculated in advance.

If the value of "[(100+m)A−100a]/m" in the above formula exceeds 30 in the above formula, oxidation is insufficient, so that the ferrous ($Fe^{2+}$) added just forms a magnetite coating or the content of the ferrous become larger than magnetite and ferrous ($Fe^{2+}$) is oxidized into ferric ($Fe^{3+}$) due to the movement of electrons in the core particles, which unfavorably damages the core particles. If the value thereof is less than 20, oxidation proceeds so much that the content of maghemite increases, which unfavorably lowers the saturation magnetization.

As the oxygen-containing gas, a mixed gas of nitrogen and oxygen, and air are usable as well as pure oxygen gas itself. Air is preferable from the point of view of economy.

An aqueous solution of a cobalt salt is then added in a non-oxidizing air. The temperature is set at not more than 60° C., preferably not less than 40° C. in order to uniformly deposit and mix an aqueous hydroxide colloid. The stirring time is preferably selected from the range of 10 to 60 minutes. If the stirring time is less than 10 minutes, there is a fear of insufficient mixing. The stirring time exceeding 60 minutes is industrially meaningless.

The temperature range for heating and stirring so as to form a cobalt-containing oxide layer by epitaxial growth is 60° C. to the boiling point thereof, preferably 90° C. to the boiling point thereof.

If the temperature is lower than 60° C., the formation of a cobalt-containing oxide layer is too slow to obtain sufficient magnetic characteristics. Even if the temperature exceeds the boiling point, a cobalt-containing oxide layer can be formed, but since an apparatus such as an autoclave is required due to a high temperature, it is industrially preferable to form a cobalt-containing oxide layer at a temperature of lower than the boiling point.

The stirring time in this case is preferably selected from the range of 30 to 900 minutes. If the stirring time is less than 30 minutes, the cobalt coating reaction is insufficient. The stirring time exceeding 900 minutes is industrially meaningless. The preferable range in practical use is 60 to 600 minutes.

The cobalt salt is added and stirred in a non-oxidizing atmosphere so as to form a cobalt-containing oxide layer. A non-oxidizing atmosphere is adopted in order to suppress the oxidation of ferrous in the magnetite coating after the formation of maghemite by the oxidation of the magnetite coating, and to form a densified cobalt-containing oxide layer, thereby obtaining a high coercive force and an excellent stability with the passage of time. It is also adopted in order to keep as much ferrous as possible, thereby producing magnetic iron oxide particles having an excellent black chromaticity.

It is preferred that the non-oxidizing atmosphere is a stream of an inert gas such as $N_2$ and Ar.

It is known, as described above, that although cobalt-coated acicular magnetite particles have a large saturation magnetization and an excellent black chromaticity, there is a problem in the magnetic stability with the passage of time. This is because the ferrous contained in the acicular magnetite particles has a high activity and is easily oxidized by the oxygen in the air.

A process for producing magnetic iron oxide particles having an excellent magnetic stability with the passage of time by a cobalt coating process using as a core particles acicular magnetite particles having such a high activity were investigated.

Although it is not clear in detail how the adsorbed ferrous hydroxide colloid is oxidized and forms a magnetite coating on the surfaces of the core particles, the present inventors consider as follow.

When positive oxidation of the ferrous hydroxide colloid adsorbed onto the surfaces of core particles such as blowing of an oxygen-containing gas is not conducted, electrons move from the ferrous in the ferrous hydroxide colloid into the core particles, that the ferrous ($Fe^{2+}$) is oxidized into ferric ($Fe^{3+}$), thereby forming a magnetite coating.

In this mechanism, due to the formation of a magnetite coating on the surfaces of the core particles, electrons consecutively move into the core particles, the core particles are damaged. Influence of this damage on various characteristics is expected, and the magnetic stability with the passage of time is deteriorated.

It is conventionally considered that the larger the thickness of a cobalt magnetic iron oxide coating layer which contains both cobalt and ferrous, the larger the effect on the improvement of the coercive force. However, it has been found that the effect on improvement of the coercive force is larger when the concentration of cobalt is increased if the cobalt content is the same.

A ferrous hydroxide colloid remains at the time of adding a cobalt salt in a conventional process, and the ferrous hydroxide colloid in the un-oxidized state and the cobalt salt form a cobalt-containing oxide layer which has a large thickness but a comparatively low concentration of cobalt. What is important to form a cobalt-containing oxide layer having a high concentration of cobalt is that a cobalt salt should be added while hardly any ferrous hydroxide colloid exists in the suspension. That is, it is necessary not only to avoid the addition of an aqueous solution of a ferrous salt simultaneous with the addition of an aqueous solution of a cobalt salt but also to quickly form the adsorbed ferrous hydroxide colloid into a magnetite coating on the surfaces of the core particles by blowing air or the like.

The present inventors investigated a method of forming a magnetite coating on the surfaces of the core particles without damaging the core particles by oxidizing the adsorbed ferrous hydroxide colloid from the outside by blowing air or the like without causing the movement of electrons from the adsorbed ferrous hydroxide colloid into the core particles. Owing to this method, an excellent magnetic stability with the passage of time is obtained.

By adding a cobalt salt while hardly any ferrous hydroxide colloid exists in the suspension, it is possible to form a cobalt-containing oxide layer which have a high concentration of cobalt, which leads to a great improvement of a coercive force.

In addition, by forming maghemite by oxidizing the surface of the magnetite coating formed on the surfaces of the core particles, as will be shown in later-described examples, it is possible to further increase the coercive force and improve the magnetic stability with the passage of time as compared with the case of forming no maghemite, as will be shown in a later-described comparative example. In this case, it is very important in the present invention to control the conditions before the formation of a cobalt coating layer.

In order to achieve the aim of the present invention by forming maghemite, it is important to control the degree of oxidation. By oxidizing the magnetite coating formed on the surfaces of core particles so as to satisfy the following formula:

$$20 \leq [(100+m)A - 100a]/m \leq 30,$$

wherein A: measured value (%) of [$Fe^{2+}$/total Fe] in the particle composed of the core particle and magnetite coating and maghemite existing at the surface thereof, which are formed on the core particle a: measured value (%) of [$Fe^{2+}$/total Fe] in the core particles m: amount of [$Fe^{2+}$] added on the assumption that the [total Fe] in the core particles is 100, it is possible to form maghemite.

The process for leading the above formula will be explained in the following.

If it is assumed that the measured value (%) of [$Fe^{2+}$/total Fe] in the core particles is a, the amount of [$Fe^{2+}$] added on the assumption that the [total Fe] in the core particles is 100 is m, the percentage (%) of [$Fe^{2+}$/total Fe] in the coating is x, and the measured value (%) of [$Fe^{2+}$/total Fe] in the particle composed of the core particle and magnetite coating and maghemite existing at the surface thereof, which are formed on the core particle is A, A is represented by the following formula:

$$A = (100 + mx)/(100 + m).$$

If the said formula is converted into the formula representing x, the following formula is obtained:

$$x = [(100+m)A - 100a]/m$$

The period in which the content x of the ferrous in the magnetite coating layer and maghemite is 20 to 30% is optimum for the degree of oxidation. This is represented by the following formula:

$$20 \leq [(100+m)A - 100a]/m \leq 30.$$

The structure of the coating formed is changed in accordance with the degree of oxidation of the adsorbed ferrous hydroxide colloid. That is, if a change in the ferrous added is observed in the process of forming magnetite by gradually oxidizing the ferrous ($Fe^{2+}$) added into ferric ($Fe^{3+}$), the percentage x of the amount of ferrous to the ferrous added at the point of time when a magnetite coating ($Fe_3O_4$) layer of a stoichiometric ratio is formed as a result of consumption of the ferrous hydroxide colloid in the suspension is 33.3%. As the surface of the magnetite coating is oxidized with the progress of oxidation and maghemite is formed, the amount of ferrous approaches 0. When the magnetite coating is oxidized and completely converted into maghemite ($\gamma$-$Fe_2O_3$), the amount of ferrous in the coating layer becomes 0. However, it has been found that the content x (wt %) of the amount of ferrous in the magnetite coating layer and maghemite to the amount of ferrous is preferably in the range of 20 to 30%, as will be shown in later-described examples and comparative examples. It is important to control the degree of oxidation in this range.

As described above, it is possible to obtain a high coercive force by rapidly oxidizing the ferrous hydroxide colloid adsorbed onto the surface of acicular magnetite particles as the core particles (e.g., for 10 to 120 minutes, preferably 30 to 90 minutes) by blowing air or the like so as to form a magnetite coating by epitaxial growth, continuing oxidation of the surface of the magnetite coating so as to form maghemite at least in a part of the surface and make the ferrous hydroxide colloid nonexistent in the suspension, changing the atmosphere to a non-oxidizing atmosphere, adding a cobalt salt to the resultant suspension so as to form a cobalt coating layer on the surface of the maghemite coating. In addition, since the maghemite and the magnetite coating are formed on the inside of the cobalt coating layer, it is difficult that the cobalt ions in the cobalt coating layer diffuse into the core particles, which greatly enhances the magnetic stability with the passage of time.

The acicular magnetic iron oxide particles of the present invention have a coercive force of 650 to 750 Oe, preferably 670 to 750 Oe, a saturation magnetization of 77 to 90 emu/g, preferably 80 to 90 emu/g, $\sigma_r/\sigma_s$ is 0.450 to 0.500, preferably 0.460 to 0.500 and an erasing characteristic of 45 to 60 dB, preferably 50 to 60 dB. The pH of the acicular magnetic iron oxide particles is 8.0 to 10.0, preferably 8.4 to 9.2 and the BET specific surface area thereof is 20 to 60 m$^2$/g, preferably 25 to 45 m$^2$/g. When the acicular magnetic iron oxide particles of the present invention are allowed to stand for 14 hours in the dry environment (20%RH) of a temperature of 60° C., the change of the coercive force is –70 to +30 Oe, preferably –60 to +30 Oe, the change of the saturation magnetization is –6.0 to –3.0 emu/g, preferably –5.5 to –3.0 emu/g, the change of the $Fe^{2+}$ content is –9.0 to –4.0 wt %, preferably –8.5 to –4.0 wt %. When the acicular magnetic iron oxide particles of the present invention are permitted to stand for 14 hours at a temperature of 60° C. and a humidity of 90% RH, the change of the coercive force is –60 to +30 Oe, preferably –50 to +30 Oe, the change of the saturation magnetization is –6.0 to –3.0 emu/g, preferably –5.5 to –3.0 emu/g, the change of the $Fe^{2+}$ content is –9.0 to –4.0 wt %, preferably –8.5 to –4.0 wt %.

A magnetic recording medium produced from the acicular magnetic iron oxide particles of the present invention has a coercive force of 660 to 760 Oe, preferably 680 to 760 Oe, a Br/Bm of 0.800 to 0.900, preferably 0.820 to 0.900, a degree of orientation of 2.00 to 3.00, preferably 2.20 to 3.00, and an SFD of 0.300 to 0.450, preferably 0.300 to 0.400.

The acicular magnetic iron oxide particles produced according to the present invention have an excellent black chromaticity and a large saturation magnetization, as will be shown in later-described examples. In addition, they have a high coercive force and an excellent magnetic stability with the passage of time in spite of a small cobalt content. The acicular magnetic iron oxide particles of the present invention are therefore suitable as a material of a high-density recording material.

The process for producing acicular magnetic iron oxide particles according to the present invention enables the acicular magnetic iron oxide particles with easiness and with a high yield, as will be described later in examples.

EXAMPLES

The present invention will now be explained with reference to examples and comparative examples.

The major axial diameter, the minor axial diameter and the aspect ratio (major axial diameter/minor axial diameter) of the particles in each of the following examples and comparative examples is expressed by the average value measured in electron microphotographs, and the specific surface area was measured by a BET method.

The magnetic characteristics were measured under an external magnetic field of 10 kOe by a vibration sample magnetometer VSM-3S-15 (manufactured by Toei Kogyo, Co., Ltd.).

The ratio [$Fe^{2+}$/total Fe] of ferrous to the total iron was obtained from the measured ferrous content and the measured total iron content. The ferrous content was measured by oxidation-reduction titration, and the total iron content was obtained by reducing the ferric contained to ferrous and measuring the total iron as ferrous by oxidation-reduction titration.

With respect to the magnetic stability with the passage of time in a dry atmosphere (20%RH), a change in the coercive force was represented by the value ($\Delta$Hc) obtained by subtracting the coercive force measured 14 days after the particles were allowed to stand at a temperature of 60° C. in a dryer from the initial coercive force. In a wet atmosphere, a change in the coercive force was represented by the value ($\Delta$Hc) obtained by subtracting the coercive force measured 14 days after the particles were allowed to stand at a temperature of 60° C. and a relative humidity of 90% from the initial coercive force.

A sheet-like sample was produced in the following way.

Magnetic iron oxide particles, a resin and solvents were charged into a 100-cc plastic bottle in the following ratio, and mixed and dispersed by a paint conditioner for 6 hours, thereby obtaining a magnetic coating material. The magnetic coating material was applied to polyethylene terephthalate film to a thickness of 25 µm with an applicator, and the obtained film was then dried in a magnetic field of 3 KGauss.
Steel ball of 3 mm in diameter 800 parts by weight
Magnetic iron oxide particles 100 parts by weight
Polyurethane resin having a sodium sulfonate group 20 parts by weight
Cyclohexanone 83.3 parts by weight
Methylethyl ketone 83.3 parts by weight
Toluene 83.3 parts by weight

Example 1

800 mg of acicular magnetite particles having an average major axial diameter of 0.22 µm, an aspect ratio (major axial diameter/minor axial diameter) of 8.0, a BET specific surface area of 32 m$^2$/g, a coercive force of 385 Oe and a saturation magnetization of 82.3 emu/g, and containing 20.2 wt % of ferrous were dispersed in 10.7 liter of water to obtain an aqueous dispersion. 1.222 liter (equivalent to 1.5N calculated as the alkali ion concentration) of an aqueous solution of NaOH of 18 mol/liter was added to the thus-obtained aqueous dispersion. After blowing $N_2$ gas thereinto to produce a non-oxidizing atmosphere, the temperature of the suspension was set at 40° C.

After 557 ml (Fe content is equivalent to 7.0 wt % based on the weight of the acicular magnetite particles (m =9.73)) of an aqueous solution of $FeSO_4$ of 1.8 mol/liter was added to the suspension, air was blown thereinto for the purpose of oxidation at a flow rate of 1.0 liter/min for 30 minutes. At this time, [$Fe^{2+}$/total Fe] A was measured, and when A reached 28.1 (equivalent to 29.1 in the formula [(100+m) A–100a]/m), oxidation was stopped. Thus, a magnetite coating was formed on the surfaces of the acicular magnetite particles, and thereafter the surface of the magnetite coating was oxidized so as to form maghemite. At this time, no ferrous hydroxide colloid existed in the suspension.

$N_2$ gas was blown into the suspension again to produce a non-oxidizing atmosphere. 150 ml (Co content is equivalent to 2.0 wt % based on the weight of the acicular magnetite particles) of an aqueous solution of $CoSO_4$ of 1.8 mol/liter was added to the suspension in one minute, and the total volume of suspension was adjusted to 13 liter. The suspension was stirred for 30 minutes. After raising the temperature of the suspension to 100° C. in the non-oxidizing atmosphere, the suspension was held for 60 minutes under heating and stirring to precipitate black particles.

The precipitated black particles were filtered out, washed with water and dried by an ordinary method.

The black particles obtained proved to be acicular magnetic iron oxide particles as a result of X-ray diffraction.

The acicular magnetic iron oxide particles obtained had an average major axial diameter of 0.22 μm, an aspect ratio (major axial diameter/minor axial diameter) of 7.7, a coercive force of 702 Oe and a saturation magnetization of 85.0 emu/g, and contained 18.15 wt % of ferrous. ΔHc was −48 Oe in a dry atmosphere, and −39 Oe in a wet atmosphere. In other words, the deterioration of the coercive force with the passage of time was small. The yield was as high as 892 g. Other properties are shown in Table 2.

When the properties of the sheet sample produced from the acicular magnetic iron oxide particles were examined, the coercive force was 727 Oe, the squareness (Br/Bm) was 0.838, the degree of orientation was 2.31° and the coercive force distribution (S.F.D) was 0.388.

Examples 2 to 7, Comparative Examples 1 to 8

Acicular magnetic iron oxide particles were obtained in the same way as in Example 1 except for varying the kind of precursor acicular magnetite particles, the temperature of the suspension, the amount of an aqueous solution of a ferrous salt, the stirring time of the suspension after the aqueous solution of a ferrous salt was added, the amount of an aqueous solution of a cobalt salt, the temperature and time after raising the temperature of the suspension, the temperature and time at which air was blown into the suspension. The yields in Examples 2 to 7 were 891 g, 880 g, 879 g, 892 g, 890 g and 890 g, respectively.

The main producing conditions and the properties of the acicular magnetic iron oxide particles obtained are shown in Tables 1 and 2.

TABLE 1

Production of Co-coated acicular magnetic iron oxide particles
Core particles

| | Kind | $Fe^{2+}$/total Fe (=a) (mol %) | BET specific surface area (m²/g) | Hc (Oe) | σs (emu/g) |
|---|---|---|---|---|---|
| Ex. 1 | Acicular magnetite (0.22 μm, aspect ratio 8) | 28.0 (20.1)* | 32.0 | 385 | 82.3 |
| Ex. 2 | Acicular magnetite (0.22 μm, aspect ratio 8) | 28.0 (20.1)* | 32.0 | 385 | 82.3 |
| Ex. 3 | Acicular magnetite (0.22 μm, aspect ratio 8) | 28.0 (20.1)* | 32.0 | 385 | 82.3 |
| Ex. 4 | Acicular magnetite (0.22 μm, aspect ratio 8) | 28.0 (20.1)* | 32.0 | 385 | 82.3 |
| Ex. 5 | Acicular magnetite (0.19 μm, aspect ratio 7) | 27.5 (19.8)* | 42.0 | 370 | 81.0 |
| Ex. 6 | Acicular magnetite (0.19 μm, aspect ratio 7) | 27.5 (19.8)* | 42.0 | 370 | 81.0 |
| Ex. 7 | Acicular magnetite (0.19 μm, aspect ratio 7) | 27.5 (19.8)* | 42.0 | 370 | 81.0 |

TABLE 1-continued

Production of Co-coated acicular magnetic iron oxide particles
Co coating conditions

| | OH concentration (mol/liter) | Controlled temperature (°C.) | Amount of $Fe^{2+}$ added (wt %) | $Fe^{2+}$/total Fe after adding $Fe^{2+}$ (mol %) | Air flow rate (liter/min) | Aeration time (min) |
|---|---|---|---|---|---|---|
| Ex. 1 | 1.5 | 40 | 7.0 (m = 9.73) | 34.4 | 1.0 air | 30 |
| Ex. 2 | 1.5 | 40 | 7.0 (m = 9.73) | 34.4 | 1.0 air | 60 |
| Ex. 3 | 1.5 | 40 | 5.7 (m = 7.92) | 33.3 | 1.0 air | 15 |
| Ex. 4 | 2.0 | 40 | 5.7 (m = 7.92) | 33.3 | 1.0 air | 30 |
| Ex. 5 | 1.5 | 48 | 7.0 (m = 9.73) | 33.9 | 1.0 air | 60 |
| Ex. 6 | 1.5 | 53 | 7.0 (m = 9.73) | 33.9 | 1.0 air | 60 |
| Ex. 7 | 1.5 | 40 | 7.0 (m = 9.73) | 33.9 | 1.0 air | 60 |

Production of Co-coated acicular magnetic iron oxide particles
Co coating conditions

| | $Fe^{2+}$/total Fe in the particles prior to forming the cobalt-containing oxide layer (mol %)(=A) | $Fe^{2+}$/the magnetite coating and maghemite (wt %) | Amount of Co added (wt %) | Aging temperature (°C.) | Aging time (min) |
|---|---|---|---|---|---|
| Ex. 1 | 28.1 | 29.1 | 2.0 | 99 | 60 |
| Ex. 2 | 27.5 | 22.4 | 2.0 | 99 | 120 |
| Ex. 3 | 28.1 | 29.4 | 2.0 | 99 | 120 |
| Ex. 4 | 27.8 | 25.3 | 2.0 | 99 | 120 |
| Ex. 5 | 27.4 | 26.4 | 1.8 | 99 | 180 |
| Ex. 6 | 27.7 | 29.8 | 2.0 | 99 | 180 |
| Ex. 7 | 27.0 | 21.9 | 2.0 | 99 | 180 |

Production of Co-coated acicular magnetic iron oxide particles
Core particles

| | Kind | $Fe^{2+}$/total Fe (=a) (mol %) | BET specific surface area (m²/g) | Hc (Oe) | σs (emu/g) |
|---|---|---|---|---|---|
| Comp. Ex. 1 | Acicular magnetite (0.22 μm, aspect ratio 8) | 28.0 (20.1)* | 32.0 | 385 | 82.3 |
| Comp. Ex. 2 | Acicular magnetite (0.22 μm, aspect ratio 8) | 28.0 (20.1)* | 32.0 | 385 | 82.3 |
| Comp. Ex. 3 | Acicular magnetite (0.22 μm, aspect ratio 8) | 28.0 (20.1)* | 32.0 | 385 | 82.3 |
| Comp. Ex. 4 | Acicular magnetite (0.22 μm, aspect ratio 8) | 28.0 (20.1)* | 32.0 | 385 | 82.3 |

TABLE 1-continued

| | | | | |
|---|---|---|---|---|
| Comp. Ex. 5 | Acicular magnetite (0.22 μm, aspect ratio 8) | 28.0 | 32.0 (20.1)* | 385 | 82.3 |
| Comp. Ex. 6 | Acicular magnetite (0.22 μm, aspect ratio 8) | 28.0 | 32.0 (20.1)* | 385 | 82.3 |
| Comp. Ex. 7 | Acicular magnetite (0.22 μm, aspect ratio 8) | 28.0 | 32.0 (20.1)* | 385 | 82.3 |
| Comp. Ex. 8 | Acicular magnetite (0.22 μm, aspect ratio 8) | 28.0 | 32.0 (20.1)* | 385 | 82.3 |

Production of Co-coated acicular magnetic iron oxide particles
Co coating conditions

| | OH concentration (mol/liter) | Controlled temperature (°C.) | Amount of $Fe^{2+}$ added (wt %) | $Fe^{2+}$/total Fe after adding $Fe^{2+}$ (mol %) | Air flow rate (liter/min) | Aeration time (min) |
|---|---|---|---|---|---|---|
| Comp. Ex. 1 | 1.5 | 40 | 7.0 (m = 9.73) | 34.4 | 1.0 $N_2$ | 60 |
| Comp. Ex. 2 | 1.5 | 40 | 7.0 (m = 9.73) | 34.4 | 1.0 air | 120 |
| Comp. Ex. 3 | 1.5 | 40 | 7.0 (m = 9.73) | 34.4 | 1.0 air | 60 |
| Comp. Ex. 4 | 1.5 | 40 | 3.2 (m = 4.45) | 31.1 | 1.0 air | 60 |
| Comp. Ex. 5 | 1.5 | 20 | 7.0 (m = 9.73) | 34.4 | 1.0 air | 100 |
| Comp. Ex. 6 | 1.5 | 20 | 7.0 (m = 9.73) | 34.4 | 1.0 air | 15 |
| Comp. Ex. 7 | 1.5 | 20 | 5.7 (m = 7.92) | 33.3 | 1.0 $N_2$ | 120 |
| Comp. Ex. 8 | 1.5 | 40 | 7.0 (m = 9.73) | 34.4 | — | — |

Production of Co-coated acicular magnetic iron oxide particles
Co coating conditions

| | $Fe^{2+}$/total Fe in the particles prior to forming the cobalt-containing oxide layer (mol %)(=A) | $Fe^{2+}$/the magnetite coating and maghemite (wt %) | Amount of Co added (wt %) | Aging temperature (°C.) | Aging time (min) |
|---|---|---|---|---|---|
| Comp. Ex. 1 | — | 100 | 2.0 | 99 | 180 |
| Comp. Ex. 2 | 25.3 | −2.4 | 2.0 | 99 | 180 |
| Comp. Ex. 3 | 27.5 | 22.4 | Co 2.0 Fe 3.8 | 99 | 180 |
| Comp. Ex. 4 | 27.7 | 21.0 | Co 2.0 Fe 3.8 | 99 in air | 180 |
| Comp. Ex. 5 | 26.4 | 9.9 | 2.0 | 99 | 120 |
| Comp. Ex. 6 | 29.1 | 40.4 | 2.0 | 99 | 120 |
| Comp. Ex. 7 | — | 100 | 2.0 | 99 | 120 |
| Comp. Ex. 8 | — | 100 | 2.0 | 99 | 120 |

(Note) *The value in the bracket is a weight percentage (wt %) of $Fe^{2+}$/core particle.

TABLE 2

Properties of acicular magnetic iron oxide particles
Magnetic characteristics

| | Hc (Oe) | σs (emu/g) | σr/σs | Erasing characteristic (dB) | pH of particles |
|---|---|---|---|---|---|
| Ex. 1 | 702 | 85.0 | 0.472 | 52.7 | 8.7 |
| Ex. 2 | 717 | 84.4 | 0.481 | 51.0 | 8.5 |
| Ex. 3 | 705 | 84.4 | 0.472 | 52.8 | 8.5 |
| Ex. 4 | 712 | 84.5 | 0.475 | 51.5 | 8.5 |
| Ex. 5 | 672 | 84.1 | 0.471 | 55.3 | 8.0 |
| Ex. 6 | 685 | 84.2 | 0.473 | 54.7 | 8.9 |
| Ex. 7 | 708 | 8.43 | 0.475 | 53.1 | 8.7 |
| Comp. Ex. 1 | 702 | 83.6 | 0.474 | 51.0 | 9.4 |
| Comp. Ex. 2 | 595 | 81.0 | 0.471 | — | 9.6 |
| Comp. Ex. 3 | 638 | 84.1 | 0.465 | 57.0 | 8.9 |
| Comp. Ex. 4 | 618 | 84.1 | 0.464 | — | 8.8 |
| Comp. Ex. 5 | 618 | 81.8 | 0.473 | — | 9.0 |
| Comp. Ex. 6 | 672 | 84.9 | 0.471 | 52.1 | 8.8 |
| Comp. Ex. 7 | 638 | 84.6 | 0.464 | 55.3 | 8.9 |
| Comp. Ex. 8 | 627 | 843 | 0.459 | — | 9.1 |

| | Properties of acicular magnetic iron oxide particles | | | Temporal stability test (14 days) 60° C. in a dry atmosphere | | |
|---|---|---|---|---|---|---|
| | BET specific surface area ($m^2/g$) | $Fe^{2+}$ content (wt %) | Co Content (wt %) | ΔHc (Oe) | Δσs (emu/g) | $\Delta Fe^{2+}$ (wt %) |
| Ex. 1 | 30.4 | 18.15 | 1.70 | −48 | −4.7 | −6.5 |
| Ex. 2 | 31.0 | 18.05 | 1.70 | −37 | −4.5 | −7.0 |
| Ex. 3 | 31.0 | 17.85 | 1.75 | −42 | −4.5 | −5.9 |
| Ex. 4 | 31.2 | 17.90 | 1.73 | −15 | −4.0 | −6.0 |
| Ex. 5 | 40.5 | 17.30 | 1.52 | −48 | −4.3 | −7.3 |
| Ex. 6 | 40.2 | 17.38 | 1.75 | −43 | −4.5 | −7.8 |
| Ex. 7 | 41.2 | 16.98 | 1.73 | −38 | −4.6 | −7.7 |
| Comp. Ex. 1 | 27.5 | 18.05 | 1.74 | −98 | −6.0 | −8.1 |
| Comp. Ex. 2 | 31.2 | 16.32 | 1.73 | −16 | −4.2 | −6.5 |
| Comp. Ex. 3 | 28.3 | 17.78 | 1.73 | −85 | −4.8 | −7.5 |
| Comp. Ex. 4 | 29.3 | 17.51 | 1.74 | −81 | −4.3 | −7.8 |
| Comp. Ex. 5 | 31.1 | 16.51 | 1.77 | −23 | −4.9 | −7.8 |
| Comp. Ex. 6 | 29.9 | 17.52 | 1.75 | −7 5 | −5.3 | −8.5 |
| Comp. Ex. 7 | 29.3 | 17.95 | 1.77 | −83 | −5.2 | −8.5 |
| Comp. Ex. 8 | 28.1 | 17.85 | 1.68 | −49 | −5.8 | −7.8 |

| | Temporal stability test (14 days) 60° C. and humidity of 90% | | | Properties of sheet | | Degree of orientation | |
|---|---|---|---|---|---|---|---|
| | ΔHc (Oe) | Δσs (emu/g) | $\Delta Fe^{2+}$ (wt %) | Hc (Oe) | Br/Bm | | SFD |
| Ex. 1 | −39 | −4.9 | −7.0 | 727 | 0.838 | 2.31 | 0.388 |
| Ex. 2 | −30 | −4.4 | −7.3 | 736 | 0.845 | 2.33 | 0.392 |
| Ex. 3 | −37 | −4.7 | −6.5 | 723 | 0.843 | 2.34 | 0.375 |
| Ex. 4 | −21 | −3.5 | −6.5 | 731 | 0.846 | 2.41 | 0.371 |
| Ex. 5 | −39 | −4.3 | −7.5 | 698 | 0.823 | 2.25 | 0.395 |

TABLE 2-continued

| | | | | | | | |
|---|---|---|---|---|---|---|---|
| Ex. 6 | −33 | −4.5 | −8.0 | 708 | 0.825 | 2.31 | 0.398 |
| Ex. 7 | −31 | −4.7 | −7.8 | 721 | 0.831 | 2.43 | 0.379 |
| Comp. Ex. 1 | −93 | −6.1 | −8.7 | 733 | 0.836 | 2.28 | 0.394 |
| Comp. Ex. 2 | −1 | −3.6 | −6.0 | 605 | 0.837 | 2.31 | 0.384 |
| Comp. Ex. 3 | −79 | −4.9 | −7.8 | 651 | 0.821 | 2.15 | 0.433 |
| Comp. Ex. 4 | −78 | −4.8 | −7.9 | 631 | 0.823 | 2.18 | 0.410 |
| Comp. Ex. 5 | −31 | −4.1 | −7.3 | 623 | 0.839 | 2.35 | 0.375 |
| Comp. Ex. 6 | −69 | −4.9 | −7.9 | 679 | 0.829 | 2.29 | 0.393 |
| Comp. Ex. 7 | −85 | −5.3 | −8.2 | 653 | 0.813 | 2.01 | 0.438 |
| Comp. Ex. 8 | −32 | −5.6 | −7.6 | 652 | 0.829 | 2.28 | 0.425 |

What is claimed is:

1. Acicular magnetic iron oxide particles comprising as core particles acicular magnetite particles having 10 to 24% by wight of ferrous ions based on the weight of the core particle;

a magnetite coating which is formed on the surfaces of said acicular magnetite particles by epitaxial growth and which has maghemite at least in a part of the surface of said magnetite coating, the $Fe^{2+}$/Fe percentage in said magnetite and maghemite coating being 20 to 30% by weight; and a cobalt-containing oxide layer which is formed on said magnetite coating and which contains cobalt of 1.5 to 2.5% by weight based on the total weight of said acicular magnetic iron oxide particles; and having a coercive force is 650 to 750 Oe, and a saturation magnetization of 77 to 90 emu/g.

2. Acicular magnetic iron oxide particles according to claim 1, wherein the ferrous ions content in the acicular magnetic oxide particles is 10 to 24% by weight based on the total weight of said acicular magnetic iron oxide particles.

3. Acicular magnetic iron oxide particles according to claim 1, wherein a change in the coercive force 14 days after said particles were permitted to stand at a temperature of 60° C. and a humidity of 90% is −60 to +30 Oe.

4. Acicular magnetic iron oxide particles according to claim 1, wherein the major axial diameter is 0.05 to 0.4 μm and the aspect ratio is not less than 4.

5. A process for producing acicular magnetic iron oxide particles comprising the steps of:

(a) adding an aqueous solution of a ferrous salt to an alkali suspension containing acicular magnetite particles having 10 to 24 wt % of ferrous ions at a temperature of 40° to 60° C. in a non-oxidizing atmosphere so as to produce a ferrous hydroxide colloid on the surface of said acicular magnetite particles;

(b) blowing an oxygen-containing gas into said suspension so as to oxidize said ferrous hydroxide colloid and form a magnetite coating on the surfaces of said acicular magnetite particles;

(c) continuing oxidation under the conditions satisfying the following formula:

$$20 \leq [(100+m)A - 100a]/m \leq 30,$$

wherein A represents the measured value (%) of $[Fe^{+2}/$ total Fe] in the particle composed of the core particle and magnetite coating and maghemite existing at the surface thereof, which are formed on the core particle, a represents the measured value (%) of $[Fe^{2+}$/total Fe] in the core particles, and m represents the amount of $[Fe^{2+}]$ added on the assumption that the [total Fe] in the core particles is 100 so as to oxidize the surface of said magnetite coating and to form maghemite at least in a part of the surface of said magnetite coating;

(d) after changing the atmosphere to a non-oxidizing atmosphere, adding an aqueous solution of a cobalt salt; and (e) heating and stirring said suspension to 60° to 100° C. so as to form a cobalt-containing oxide layer on the surface of said magnetite coating and maghemite.

6. Acicular magnetic iron oxide produced by the process of claim 5, said particles comprising:

as core particles acicular magnetite particles having 10 to 24% by weight of ferrous ions based on the weight of the core particle;

a magnetite coating which is formed on the surfaces of said acicular magnetite particles by epitaxial growth and which has maghemite at least in a part of the surface of said magnetite coating, the $Fe^{2+}$/Fe percentage in said magnetite and maghemite coating being 20 to 30% by weight; and a cobalt-containing oxide layer which is formed on said magnetite coating and which contains cobalt of 1.5 to 2.5 wt % based on the total weight of said acicular magnetic iron oxide particles.

* * * * *